(12) United States Patent
Lin

(10) Patent No.: US 11,044,707 B2
(45) Date of Patent: Jun. 22, 2021

(54) METHOD AND DEVICE FOR RADIO COMMUNICATION

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/692,556

(22) Filed: Nov. 22, 2019

(65) Prior Publication Data
US 2020/0092877 A1 Mar. 19, 2020

Related U.S. Application Data

(63) Continuation of application No. PCT/CN2017/086654, filed on May 31, 2017.

(51) Int. Cl.
*H04W 72/00* (2009.01)
*H04W 72/04* (2009.01)
(Continued)

(52) U.S. Cl.
CPC ....... *H04W 72/0413* (2013.01); *H04L 5/0055* (2013.01); *H04W 16/00* (2013.01)

(58) Field of Classification Search
CPC .............. H04W 72/0413; H04W 16/00; H04L 5/0055
(Continued)

(56) References Cited

U.S. PATENT DOCUMENTS 9,602,252 B2 * 3/2017 Takeda .................. H04L 1/1854
2010/0173641 A1 7/2010 Kim et al.
(Continued)

FOREIGN PATENT DOCUMENTS

CN 101132648 2/2008
CN 101203020 6/2008
(Continued)

OTHER PUBLICATIONS

WIPO, ISR for PCT/CN2017/086654, dated Mar. 8, 2018.
Sharp, "UCI reporting on PUCCH and PUSCH," 3GPP TSG RAN WG1 Meeting #89, R1-1708374, May 2017, 3 pages.
EPO, Office Action for EP Application No. 17912141.3, dated Apr. 16, 2020.
(Continued)

*Primary Examiner* — Marcos Batista
(74) *Attorney, Agent, or Firm* — Hodgson Russ LLP

(57) ABSTRACT

The embodiments of the present application provide a wireless communication method and a wireless communication device. The method includes: the terminal device determining first uplink control information and a first uplink channel to be transmitted to a network device in a first time unit, wherein the first uplink channel is used for carrying other information than the first uplink control information, and a time domain resource for transmitting the first uplink channel comprises at least part of time domain resources for transmitting the first uplink control information; and the terminal device determining a channel and/or information to be transmitted in the first time unit according to a transmission parameter corresponding to the first uplink control information and a transmission parameter of the first uplink channel.

18 Claims, 4 Drawing Sheets

(51) Int. Cl.
*H04L 5/00* (2006.01)
*H04W 16/00* (2009.01)

(58) Field of Classification Search
USPC .......................................... 455/450; 370/338
See application file for complete search history.

(56) References Cited

U.S. PATENT DOCUMENTS

2016/0095104 A1* 3/2016 Chen ..................... H04L 5/0048
370/329
2017/0134881 A1* 5/2017 Oh ....................... H04W 56/001

FOREIGN PATENT DOCUMENTS

| CN | 101409894 | 4/2009 |
|----|-----------|--------|
| CN | 102970124 | 3/2013 |
| CN | 106716894 | 5/2017 |
| DE | 69822402 | 3/2005 |
| EP | 2165434 | 3/2010 |
| GB | 2495473 | 4/2013 |
| JP | S63292900 | 11/1988 |
| RU | 2504904 | 1/2014 |

OTHER PUBLICATIONS

Intel Corporation, "UCI multiplexing onto PUSCH," 3GPP TSG RAN WG1 Meeting #89, R1-1707399, May 15, 2017, 4 pages.
CATT, "Scheduling and HARQ support for NR DC," 3GPP TSG RAN WG1 Meeting #89, R1-1707518, May 15, 2017, 3 pages.
ZTE, "[88b-13] Summary Email discussion on: 'CBG based retransmission, Transmission/retransmission of preempted data before/after ACK NACK feedback, Preemption indication for NR,'" 3GPP TSG RAN WG1 Meeting #89, R1-1709148, May 15, 2017, 6 pages.
ZTE et al., "Proposals from discussion Tuesday's offline on CBG," 3GPP TSG RAN WG1 #89, R1-1709509, May 15, 2017, 2 pages.
Federal Service for Intellectual Property (Rospatent), Notice of Allowance in RU App. No. 2019143444/07(084239), Aug. 7, 2020, 20 pages (including translation).
IPOS, Invitation to Respond to Written Opinion in SG App. No. 11201911138V, dated Aug. 20, 2020, 6 pages.
ISDEC, Office Action for CA Application No. 3064964, dated Feb. 16, 2021.
EPO, Communication for EP Application No. 17912141.3, dated Feb. 3, 2021.
INAPI, Office Action for CL Application No. 201903487, dated Apr. 19, 2021.
CNIPA, First Office Action for CN Application No. 201911295966.1, dated Apr. 19, 2021.

* cited by examiner

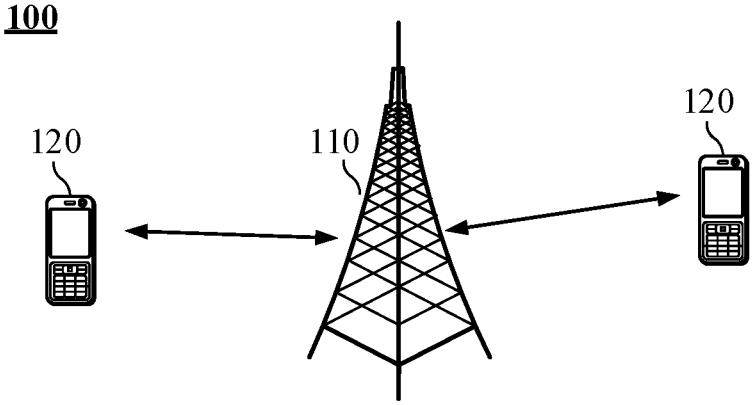

| |
|---|
| The terminal device determining first uplink control information and a first uplink channel to be transmitted to the network device in a first time unit, wherein the first uplink channel is used to carry other information than the first uplink control information, and transmitting a time domain resource of the first uplink channel includes transmitting at least part of the time domain resources of the first uplink control information | 210

| |
|---|
| The terminal device determining a channel and/or information to be transmitted in the first time unit according to a transmission parameter corresponding to the first uplink control information and a transmission parameter of the first uplink channel | 220

┌─────────────────────────────────────────────────────┐
│ The network device determining first uplink control information
│ and a first uplink channel to be received from the terminal device
│ in a first time unit, wherein the first uplink channel is used to       ╱ 310
│ carry other information than the first uplink control information,
│ and a time domain resource of the first uplink channel includes at
│ least part of the time domain resources of the first uplink control
│ information
└─────────────────────────────────────────────────────┘
                              │
                              ▼
┌─────────────────────────────────────────────────────┐
│ The network device determining a channel and/or information to         ╱ 320
│ be received in the first time unit according to a transmission
│ parameter corresponding to the first uplink control information
│ and a transmission parameter of the first uplink channel
└─────────────────────────────────────────────────────┘

FIG. 3

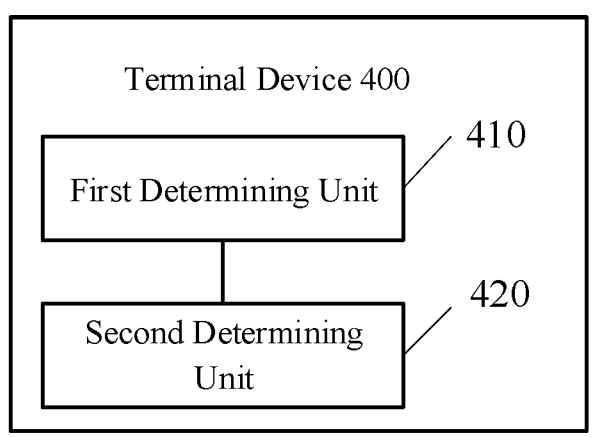

FIG. 4

METHOD AND DEVICE FOR RADIO COMMUNICATION

CROSS-REFERENCE TO RELATED APPLICATION

This application is a continuation of International Application No. PCT/CN2017/086,654, filed on May 31, 2017, the entire disclosure of which is incorporated herein by reference.

TECHNICAL FIELD

The present disclosure relates to the field of communication technology, in particular, relates to a method and a device for radio communication.

BACKGROUND

In a new radio (NR) system, the same terminal may use different transmission parameters for different channels and/or information, or may also use the same transmission parameters, which may be, for example, a transmission time interval (TTI) or a subcarrier space.

SUMMARY

Embodiments of the present application provide a wireless communication method and a wireless communication device.

In a first aspect, there is provided a wireless communication method, including:

determining, by a terminal device, first uplink control information and a first uplink channel to be transmitted to a network device in a first time unit, wherein the first uplink channel is used for carrying other information than the first uplink control information, and a time domain resource for transmitting the first uplink channel comprises at least part of time domain resources for transmitting the first uplink control information; and determining, by the terminal device, at least one of a channel or information to be transmitted in the first time unit according to a transmission parameter corresponding to the first uplink control information and a transmission parameter of the first uplink channel.

In connection with the first aspect, in a possible implementation of the first aspect, the first uplink control information includes at least one of:

scheduling request information corresponding to at least one uplink logical channel;

positive/negative response ACK/NACK information corresponding to at least one downlink physical channel; or channel state information measured on at least one group of downlink physical resources.

In connection with the first aspect and any of the above possible implementations, in another possible implementation of the first aspect, the transmission parameter corresponding to the first uplink control information includes at least one of:

a transmission parameter of the at least one uplink logical channel;

a transmission parameter of the at least one downlink physical channel; or transmission parameter of the at least one group of downlink physical resources.

In connection with the first aspect and any of the above possible implementations, in another possible implementation of the first aspect, the transmission parameter includes at least one of:

a transmission time interval TTI; or a subcarrier space.

In connection with the first aspect and any of the above possible implementations, in another possible implementation of the first aspect, the first uplink channel is a first uplink shared channel; or the first uplink channel is a first uplink control channel.

In connection with the first aspect and any of the above possible implementations, in another possible implementation of the first aspect, the channel as determined to be transmitted in the first time unit includes the first uplink channel and/or a second uplink control channel other than the first uplink channel.

In connection with the first aspect and any of the above possible implementations, in another possible implementation of the first aspect, the information as determined to be transmitted in the first time unit includes the first uplink control information or first information, and the first information includes content related to the content indicated by the first uplink control information.

In connection with the first aspect and any of the above possible implementations, in another possible implementation of the first aspect, when the first uplink control information is scheduling request information corresponding to an uplink logical channel, the first information is buffer status report BSR information corresponding to the uplink logical channel.

In connection with the first aspect and any of the above possible implementations, in another possible implementation of the first aspect, when the first uplink control information corresponds to one transmission parameter, determining, by the terminal device, a channel and/or information to be transmitted in the first time unit according to a transmission parameter corresponding to the first uplink control information and a transmission parameter of the first uplink channel includes:

when the transmission parameter corresponding to the first uplink control information and the transmission parameter of the first uplink channel satisfy a first relationship, the terminal device determining to transmit the first uplink control information on a second uplink control channel; or when the transmission parameter corresponding to the first uplink control information and the transmission parameter of the first uplink channel satisfy a second relationship, the terminal device determining to transmit the first uplink control information or first information on the first uplink channel.

In connection with the first aspect and any of the above possible implementations, in another possible implementation of the first aspect, the first relationship is:

the transmission time interval corresponding to the first uplink control information being smaller than the transmission time interval of the first uplink channel; or the subcarrier space corresponding to the first uplink control information being larger than the subcarrier space of the first uplink channel.

In connection with the first aspect and any of the above possible implementations, in another possible implementation of the first aspect, the second relationship is:

the transmission time interval corresponding to the first uplink control information being larger than or equal to the transmission time interval of the first uplink channel; or the subcarrier space corresponding to the first uplink control information being smaller than or equal to the subcarrier space of the first uplink channel.

In connection with the first aspect and any of the above possible implementations, in another possible implementation of the first aspect, when the first uplink control information corresponds to a plurality of transmission parameters, determining, by the terminal device, a channel and/or information to be transmitted in the first time unit according to a transmission parameter corresponding to the first uplink control information and a transmission parameter of the first uplink channel includes:

when the extreme value of the plurality of transmission parameters corresponding to the first uplink control information and the transmission parameter of the first uplink channel satisfy a third relationship, the terminal device determining to transmit the first uplink control information on a second uplink control channel; or when the extreme value of the plurality of transmission parameters corresponding to the first uplink control information and the transmission parameter of the first uplink channel satisfy a fourth relationship, the terminal device determining to transmit the first uplink control information or first information on the first uplink channel.

In connection with the first aspect and any of the above possible implementations, in another possible implementation of the first aspect, the third relationship is:

the extreme value of the plurality of transmission time intervals corresponding to the first uplink control information being smaller than the transmission time interval of the first uplink channel; or the extreme value of the subcarrier spaces corresponding to the first uplink control information being larger than the subcarrier space of the first uplink channel.

In connection with the first aspect and any of the above possible implementations, in another possible implementation of the first aspect, the fourth relationship is:

the extreme value of the transmission time intervals corresponding to the first uplink control information being larger than or equal to the transmission time interval of the first uplink channel; or the extreme value of the subcarrier spaces corresponding to the first uplink control information being smaller than or equal to the subcarrier space of the first uplink channel.

In connection with the first aspect and any of the above possible implementations, in another possible implementation of the first aspect, when the transmission parameter is a transmission time interval, the extreme value is a minimum value of the plurality of transmission time intervals; or when the transmission parameter is a subcarrier space, the extreme value is a maximum value of the subcarrier spaces.

In connection with the first aspect and any of the above possible implementations, in another possible implementation of the first aspect, when the first uplink control information corresponds to a plurality of transmission parameters, determining, by the terminal device, a channel and/or information to be transmitted in the first time unit according to a transmission parameter corresponding to the first uplink control information and a transmission parameter of the first uplink channel includes:

the terminal device determining to transmit a second uplink control information included in the first uplink control information on second uplink control channel; and the terminal device determining to transmit third uplink control information included in the first uplink control information or third information on the first uplink channel, wherein the third information includes content indicated by the third uplink control information;

wherein the transmission parameter corresponding to the second uplink control information and the transmission parameter of the first uplink channel satisfy a fifth relationship, and the transmission parameter corresponding to the third uplink control information and the transmission parameter of the first uplink channel satisfy a sixth relationship.

In connection with the first aspect and any of the above possible implementations, in another possible implementation of the first aspect, the fifth relationship includes:

the transmission time interval corresponding to the second uplink control information being smaller than the transmission time interval of the first uplink channel; or the subcarrier space corresponding to the second uplink control information being larger than the subcarrier space of the first uplink channel.

In connection with the first aspect and any of the above possible implementations, in another possible implementation of the first aspect, the sixth relationship includes:

the transmission time interval corresponding to the third uplink control information being larger than or equal to the transmission time interval of the first uplink channel; or the subcarrier space corresponding to the third uplink control information being smaller than or equal to the subcarrier space of the first uplink channel.

In connection with the first aspect and any of the above possible implementations, in another possible implementation of the first aspect, the first uplink channel is transmitted on a first time domain resource, and the first time domain resource does not include the time domain resource used for the second uplink control channel.

In a second aspect, there is provided a wireless communication method, including:

determining, by a network device, first uplink control information and a first uplink channel to be received from a terminal device in a first time unit, wherein the first uplink channel is used for carrying other information than the first uplink control information, and a time domain resource of the first uplink channel includes at least part of the time domain resources of the first uplink control information; and determining, by the network device, a channel and/or information to be received in the first time unit according to a transmission parameter corresponding to the first uplink control information and a transmission parameter of the first uplink channel.

In connection with the second aspect, in a possible implementation of the second aspect, the first uplink control information includes at least one of:

scheduling request information corresponding to at least one uplink logical channel;

positive/negative response ACK/NACK information corresponding to at least one downlink physical channel; or channel state information measured on at least one group of downlink physical resources.

In connection with the second aspect and any of the above possible implementations, in another possible implementation of the second aspect, the transmission parameter corresponding to the first uplink control information includes at least one of:

a transmission parameter of the at least one uplink logical channel;

a transmission parameter of the at least one downlink physical channel; or transmission parameters of the at least one group of downlink physical resources.

In connection with the second aspect and any of the above possible implementations, in another possible implementation of the second aspect, the transmission parameter includes at least one of:
a transmission time interval TTI; or
a subcarrier space.

In connection with the second aspect and any of the above possible implementations, in another possible implementation of the second aspect, the first uplink channel is a first uplink shared channel; or
the first uplink channel is a first uplink control channel.

In connection with the second aspect and any of the above possible implementations, in another possible implementation of the second aspect, the channel as determined to be received in the first time unit includes the first uplink channel and/or a second uplink control channel other than the first uplink channel.

In connection with the second aspect and any of the above possible implementations, in another possible implementation of the second aspect, the information as determined to be received in the first time unit includes the first uplink control information or first information, and the first information includes content related to the content indicated by the first uplink control information.

In connection with the second aspect and any of the above possible implementations, in another possible implementation of the second aspect, when the first uplink control information is scheduling request information corresponding to an uplink logical channel, the first information is buffer status report BSR information corresponding to the uplink logical channel.

In connection with the second aspect and any of the above possible implementations, in another possible implementation of the second aspect, when the first uplink control information corresponds to one transmission parameter, determining, by the network device, a channel and/or information to be received in the first time unit according to a transmission parameter corresponding to the first uplink control information and a transmission parameter of the first uplink channel includes:
when the transmission parameter corresponding to the first uplink control information and the transmission parameter of the first uplink channel satisfy a first relationship, the network device determining to receive the first uplink control information on a second control channel; or
when the transmission parameter corresponding to the first uplink control information and the transmission parameter of the first uplink channel satisfy a second relationship, the network device determining to receive the first uplink control information or first information on the first uplink channel.

In connection with the second aspect and any of the above possible implementations, in another possible implementation of the second aspect, the first relationship is:
the transmission time interval corresponding to the first uplink control information being smaller than the transmission time interval of the first uplink channel; or
the subcarrier space corresponding to the first uplink control information being larger than the subcarrier space of the first uplink channel.

In connection with the second aspect and any of the above possible implementations, in another possible implementation of the second aspect, the second relationship is:
the transmission time interval corresponding to the first uplink control information being larger than or equal to the transmission time interval of the first uplink channel; or the subcarrier space corresponding to the first uplink control information being smaller than or equal to the subcarrier space of the first uplink channel.

In connection with the second aspect and any of the above possible implementations, in another possible implementation of the second aspect, when the first uplink control information corresponds to a plurality of transmission parameters, determining, by the network device, a channel and/or information to be received in the first time unit according to a transmission parameter corresponding to the first uplink control information and a transmission parameter of the first uplink channel includes:
when the extreme value of the plurality of transmission parameters corresponding to the first uplink control information and the transmission parameter of the first uplink channel satisfy a third relationship, the network device determining to receive the first uplink control information on a second control channel; or
when the extreme value of the plurality of transmission parameters corresponding to the first uplink control information and the transmission parameter of the first uplink channel satisfy a fourth relationship, the network device determining to receive the first uplink control information or first information on the first uplink channel.

In connection with the second aspect and any of the above possible implementations, in another possible implementation of the second aspect, the third relationship is:
the extreme value of the plurality of transmission time intervals corresponding to the first uplink control information being smaller than the transmission time interval of the first uplink channel; or
the extreme value of the subcarrier space corresponding to the first uplink control information being larger than the subcarrier space of the first uplink channel.

In connection with the second aspect and any of the above possible implementations, in another possible implementation of the second aspect, the fourth relationship is:
the extreme value of the transmission time intervals corresponding to the first uplink control information being larger than or equal to the transmission time interval of the first uplink channel; or
the extreme value of the subcarrier spaces corresponding to the first uplink control information being smaller than or equal to the subcarrier space of the first uplink channel.

In connection with the second aspect and any of the above possible implementations, in another possible implementation of the second aspect, when the transmission parameter is a transmission time interval, the extreme value is a minimum value of the plurality of transmission time intervals; or
when the transmission parameter is a subcarrier space, the extreme value is a maximum value of the subcarrier spaces.

In connection with the second aspect and any of the above possible implementations, in another possible implementation of the second aspect, when the first uplink control information corresponds to a plurality of transmission parameters, determining, by the network device, a channel and/or information to be received in the first time unit according to a transmission parameter corresponding to the first uplink control information and a transmission parameter of the first uplink channel includes:
the network device determining to receive a second control information included in the first uplink control information on second control channel; and
the network device determining to receive third control information included in the first uplink control information or first information on the first uplink channel, wherein the first information includes content related to the third control information;

wherein the transmission parameter corresponding to the second uplink control information and the transmission parameter of the first uplink channel satisfy a fifth relationship, and the transmission parameter corresponding to the third uplink control information and the transmission parameter of the first uplink channel satisfy a sixth relationship.

In connection with the second aspect and any of the above possible implementations, in another possible implementation of the second aspect, the fifth relationship includes:

the transmission time interval corresponding to the second uplink control information being smaller than the transmission time interval of the first uplink channel; or the subcarrier space corresponding to the second uplink control information being larger than the subcarrier space of the first uplink channel.

In connection with the second aspect and any of the above possible implementations, in another possible implementation of the second aspect, the sixth relationship includes:

the transmission time interval corresponding to the third uplink control information being larger than or equal to the transmission time interval of the first uplink channel; or the subcarrier space corresponding to the third uplink control information being smaller than or equal to the subcarrier space of the first uplink channel.

In connection with the second aspect and any of the above possible implementations, in another possible implementation of the second aspect, the first uplink channel is received on a first time domain resource, and the first time domain resource does not include the time domain resources used for the second uplink control channel.

In a third aspect, a terminal device is provided for performing the method of the above first aspect or any of the possible implementations of the first aspect. In particular, the terminal device includes functional modules for performing the method of the above first aspect or any of the possible implementations of the first aspect.

In a fourth aspect, a network device is provided for performing the method of the above second aspect or any of the possible implementations of the second aspect. In particular, the network device includes functional modules for performing the method of the above second aspect or any of the possible implementations of the second aspect.

In a fifth aspect, a terminal device is provided, including a processor, a memory, and a transceiver. The processor, the memory, and the transceiver communicate with each other through an internal connection path, for transmitting control and/or data signals, such that the network device performs the method of the above first aspect or any of the possible implementations of the first aspect.

In a sixth aspect, a network device is provided, including a processor, a memory, and a transceiver. The processor, the memory, and the transceiver communicate with each other through an internal connection path, for transmitting control and/or data signals, such that the network device performs the method of the above second aspect or any of the possible implementations of the second aspect.

In a seventh aspect, a computer readable medium is provided for storing a computer program, the computer program including instructions for performing the above first aspect or any of the possible implementations of the first aspect.

In an eighth aspect, a computer readable medium is provided for storing a computer program, the computer program including instructions for performing the above second aspect or any of the possible implementations of the second aspect.

In a ninth aspect, a computer program product is provided, including instructions which, when being executed on a computer, cause the computer to perform the method of the above first aspect or any of the optional implementations of the first aspect or of the above second aspect or any of the optional implementations of the second aspect.

BRIEF DESCRIPTION OF THE DRAWINGS

In order to more clearly illustrate the technical solutions of the embodiments of the present application, the drawings to be used in the embodiments or the prior art description will be briefly described below. Apparently, the drawings in the following description are only some embodiments of the present application. Those skilled in the art can obtain other drawings according to the drawings without any creative work.

FIG. 1 is a schematic diagram of a wireless communication system according to an embodiment of the present application.

FIG. 2 is a schematic flowchart of a wireless communication method according to an embodiment of the present application.

FIG. 3 is a schematic flowchart of a wireless communication method according to an embodiment of the present application.

FIG. 4 is a schematic block diagram of a terminal device according to an embodiment of the present application.

DETAILED DESCRIPTION

Figure 5:
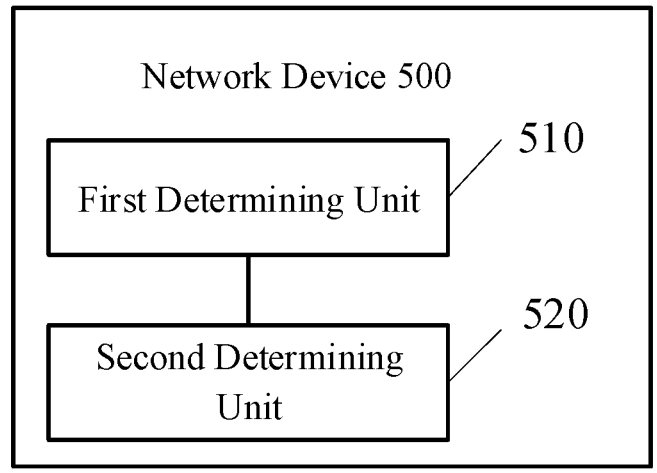
FIG. 5 is a schematic block diagram of a network device according to an embodiment of the present application.

The technical solutions in the embodiments of the present application are described in conjunction with the accompanying drawings in the embodiments of the present application. It is apparent that the described embodiments are a part of the embodiments of the present application, and not all of the embodiments. All other embodiments obtained by a person of ordinary skill in the art based on the embodiments of the present application without paying creative work all fall in the protection scope of the present application.

The technical solution of the embodiment of the present application can be applied to various communication systems, for example, Global System of Mobile communication ("GSM") system, Code Division Multiple Access ("CDMA") system, Wideband Code Division Multiple Access ("WCDMA") system, General Packet Radio Service ("GPRS"), Long Term Evolution ("LTE") system, LTE Frequency Division Duplex ("FDD") system, LTE Time Division Duplex ("TDD"), Universal Mobile Telecommunication System ("UMTS"), Worldwide Interoperability for Microwave Access ("WiMAX") communication system, or a future 5G system (also known as a New Radio (NR) system).

FIG. 1 shows a wireless communication system 100 to which an embodiment of the present application is applied. The wireless communication system 100 can include a network device 110. The network device 110 can be a device that is in communication with a terminal device. The network device 110 can provide communication coverage for a particular geographic area and can communicate with a terminal device (e.g., UE) located within the coverage area. In at least one embodiment, the network device 110 can be a base station (Base Transceiver Station, BTS) in a GSM system or a CDMA system, or can be a base station (NodeB, NB) in a WCDMA system, or can be an evolved base station in an LTE system. (Evolutional Node B, eNB or eNodeB), or a wireless controller in a Cloud Radio Access Network (CRAN), or the network device can be a relay station, an access point, an in-vehicle device, a wearable device, a network side device in a future 5G network or a network device in a Public Land Mobile Network (PLMN) evolved in the future, and the like.

The wireless communication system 100 also includes at least one terminal device 120 located within the coverage of the network device 110. The terminal device 120 can be mobile or fixed. In at least one embodiment, the terminal device 120 can refer to an access terminal, a user equipment (User Equipment, UE), a subscriber unit, a subscriber station, a mobile station, a mobile platform, a remote station, a remote terminal, a mobile device, a user terminal, a terminal, a wireless communication device, a user agent, or a user device. The access terminal can be a cellular phone, a cordless phone, a Session Initiation Protocol (SIP) phone, a Wireless Local Loop (WLL) station, a Personal Digital Assistant (PDA), a handheld device with wireless communication functional, a computing device or other processing device connected to a wireless modem, an in-vehicle device, a wearable device, a terminal device in future 5G networks, or a terminal device in future evolved PLMNs, and the like.

In at least one embodiment, device to device (D2D) communication can be performed between terminal devices 120.

In at least one embodiment, the 5G system or network can also be referred to as a New Radio (NR) system or network.

FIG. 1 exemplarily shows one network device and two terminal devices. In at least one embodiment, the wireless communication system 100 can include a plurality of network devices and can include other numbers of terminal devices within the coverage of each network device. The embodiments of the application do not limit this.

In at least one embodiment, the wireless communication system 100 can further include other network entities, such as a network controller, a mobility management entity, and the like.

It should be understood that the terms "system" and "network" are used interchangeably herein. The term "and/or" herein only describes an association between associated objects, indicating that there can be three relationships. For example, A and/or B can indicate three situations: respectively only A exists, both A and B exist, and only B exists. In addition, the character "/" herein generally indicates that the associated objects in the context are in an "or" relationship.

FIG. 2 is a schematic flowchart of a wireless communication method 200 according to an embodiment of the present application. In at least one embodiment the method 200 is applicable to the system shown in FIG. 1, but is not limited thereto. The method 200 includes at least some of the following.

In 210, the terminal device determines first uplink control information and a first uplink channel to be transmitted to the network device in a first time unit, wherein the first uplink channel is used for carrying other information than the first uplink control information, and a time domain resource for transmitting the first uplink channel includes at least part of the time domain resources for transmitting the first uplink control information.

In at least one embodiment, the terminal device can be pre-configured (e.g., network device pre-configuration or factory pre-configuration) to transmit the first uplink control information and the first uplink channel in the first time unit.

In at least one embodiment, the first uplink channel is pre-configured to carry other information than the first uplink control information.

In at least one embodiment, the first uplink channel can be a first uplink shared channel or a first uplink control channel.

For example, the first uplink channel can be a first uplink shared channel, and the first uplink channel is configured to carry data sent to the network device.

For example, the first uplink channel can be a first uplink control channel, and the first uplink channel is configured to carry scheduling request information or acknowledgment (ACK)/Non-Acknowledge (NACK) information sent to the network device, and the like.

The time domain resource for transmitting the first uplink channel is a time domain resource that is pre-configured for the terminal device to send the first uplink channel. The time domain resource for transmitting the first uplink control information is a time domain resource that is preconfigured for the terminal device to send the first uplink control information.

In at least one embodiment, the first uplink control information includes at least one of the following:
scheduling request information corresponding to at least one uplink logical channel, wherein the scheduling request information can be 1-bit information, and the 1-bit information is used for indicating whether the corresponding uplink logical channel of the terminal device has data to be transmitted. For example, 1 is used for indicating that there is data to be transmitted, and 0 is used for indicating that there is no data to be transmitted;
positive/negative response information corresponding to at least one downlink physical channel; or
channel state information measured on at least one group of downlink physical resources.

In at least one embodiment, when the first uplink control information is a scheduling request, the first uplink channel can be a data channel carrying uplink data, a channel carrying ACK/NACK, or a channel carrying channel state information.

In at least one embodiment, when the first uplink control information is ACK/NACK information, the first uplink channel can be a channel carrying scheduling request information, a data channel carrying uplink data, or a channel carrying channel state information.

In at least one embodiment, when the first uplink control information is channel state information, the first uplink channel can be a channel carrying scheduling request information, a data channel carrying uplink data, or a channel carrying channel state information.

In at least one embodiment, the logical channel mentioned in the embodiments of the present application can be in one-to-one correspondence with the traffic to be transmitted.

In 220, the terminal device determines a channel and/or information to be transmitted in the first time unit according to transmission parameter(s) corresponding to the first uplink control information and transmission parameter(s) of the first uplink channel.

In at least one embodiment, when the first uplink control information includes scheduling request information corresponding to at least one uplink logical channel, the transmission parameter corresponding to the first uplink control information can include transmission parameter(s) of the at least one uplink logical channel.

In at least one embodiment, when the first uplink control information includes positive/negative response information corresponding to the at least one downlink physical channel, the transmission parameter corresponding to the first uplink control information can be transmission parameter(s) of the at least one downlink physical channel.

In at least one embodiment, when the first uplink control information includes channel state information measured on at least one group of downlink physical resources, the transmission parameter corresponding to the first uplink control information can be transmission parameter(s) of the at least one group of downlink physical resources.

In at least one embodiment, in the embodiments of the present application, the transmission parameter can be a transmission time interval or a subcarrier space. Of course, it can also be other parameters, such as symbol length and the like.

In at least one embodiment, the information that is determined by the terminal device to be transmitted in the first time unit includes first the uplink control information or first information, wherein the first information includes content related to the content indicated by the first uplink control information. Of course, the information to be transmitted in the first time unit can further include information preconfigured to be transmitted by the first uplink channel.

In at least one embodiment, when the first uplink control information is the scheduling request information corresponding to the uplink logical channel, the first information is Buffer State Report (BSR) information corresponding to the uplink logical channel.

In at least one embodiment, the channel that is determined by the terminal device to be transmitted in the first time unit includes a first uplink channel, and/or a second uplink control channel other than the first uplink channel, wherein the second uplink control channel is a channel pre-configured to transmit the first uplink control information.

In at least one embodiment, when the channel transmitted in the first time unit includes the first uplink channel and does not include the second uplink control channel, the information to be transmitted on the first uplink channel in the first time unit includes the first information or the first uplink control information.

In at least one embodiment, when the channel to be transmitted in the first time unit includes the second uplink control channel, the information to be transmitted on the second uplink control channel in the first time unit includes the first uplink control information.

In at least one embodiment, the first uplink control information can correspond to one transmission parameter or a plurality of transmission parameters.

The first uplink control information can correspond to one transmission parameter. That is, for a specific transmission parameter, the value of the transmission parameter is one, for example, one subcarrier space or one transmission time interval.

The first uplink control information can correspond to a plurality of transmission parameters. That is, for a specific transmission parameter, the transmission parameter has a plurality of values, for example, a plurality of subcarrier spaces or a plurality of transmission time intervals.

For example, when the first uplink control information includes scheduling request information corresponding to one logical channel, the first uplink control information corresponds to one transmission parameter.

For example, when the first uplink control information includes scheduling request information corresponding to a plurality of logical channels, and the transmission parameter of each logical channel is the same, the first uplink control information corresponds to one transmission parameter.

For example, when the first uplink control information includes scheduling request information corresponding to a plurality of logical channels, and the transmission parameters of at least part of the plurality of logical channels are different from the transmission parameters of the other logical channels, the first uplink control information corresponds to a plurality of transmission parameters.

In order to understand the present application more clearly, how to determine the channel and/or information to be transmitted in the first time unit will be described below with reference to examples respectively when the transmission parameter corresponding to the first uplink control information is one transmission parameter or a plurality of transmission parameters.

In the example, referring to Table 1, the first uplink channel is a physical uplink shared channel (PUSCH), and the first uplink control information is scheduling request information preconfigured to be transmitted on a Physical Uplink Control Channel (PUCCH).

TABLE 1

| index | first uplink channel transmission parameter | uplink scheduling request corresponding logical channel transmission parameter | transmission in the first time unit |
|---|---|---|---|
| 1 | PUSCH, TTI = 0.5 ms | logic channel 1, TTI = 1 ms | transmit BSR corresponding to the logic channel 1 on PUSCH |
| 2 | PUSCH, sub-carrier space is 30 kHz | logic channel 1, subcarrier space is 15 kHz | |
| 3 | PUSCH, TTI = 0.5 ms | logic channel 1, TTI = 0.2 ms | transmit the uplink scheduling request on PUCCH |
| 4 | PUSCH, sub-carrier space is 15 kHz | logic channel 1, subcarrier space is 30 kHz | |
| 5 | PUSCH, TTI = 0.2 ms | logic channel 1, TTI = 1 ms logic channel2, TTI = 0.5 ms | transmit BSR corresponding to the logic channels 1 and 2 on PUSCH |
| 6 | PUSCH, sub-carrier space is 60 kHz | logic channel 1, subcarrier space is 15 kHz logic channel2, subcarrier space is 30 kHz | |
| 7 | PUSCH, TTI = 1 ms | logic channel 1, TTI = 0.2 ms logic channel2, TTI = 0.5 ms | transmit the uplink scheduling request on PUCCH |
| 8 | PUSCH, sub-carrier space is 15 kHz | logic channel 1, subcarrier space is 60 kHz logic channel2, subcarrier space is 30 kHz | |
| 9 | PUSCH, TTI = 0.5 ms | logic channel 1, TTI = 1 ms logic channel2, TTI = 0.2 ms | transmit BSR corresponding to the logic channel 1 on PUSCH; transmit the uplink scheduling request corresponding to the logic channel 2 on PUCCH |
| 10 | PUSCH, sub-carrier space is 30 kHz | logic channel 1, subcarrier space is 15 kHz logic channel2, subcarrier space is 60 kHz | |

It should be understood that the features between the following examples can be utilized interchangeably without contradiction.

EXAMPLE A

In the case that the first uplink control information corresponds to one transmission parameter, when the transmission parameter corresponding to the first uplink control information and the transmission parameter of the first uplink channel satisfy a first relationship, the terminal device determines that the channel to be transmitted in the first time unit includes a second control channel, and the information to be transmitted on the second control channel in the first time unit includes the first uplink control information; or when the transmission parameter corresponding to the first uplink control information and the transmission parameter of the first uplink channel satisfy a second relationship, the terminal device determines that the channel to be transmitted in the first time unit includes the first uplink channel, and the information to be transmitted on the first uplink channel includes the first uplink control information or the first information.

In at least one embodiment, the first relationship is: the transmission time interval corresponding to the first uplink control information being smaller than the transmission time interval of the first uplink channel; or the subcarrier space corresponding to the first uplink control information being larger than the subcarrier space of the first uplink channel.

In at least one embodiment, the second relationship is: the transmission time interval corresponding to the first uplink control information being larger than or equal to the transmission time interval of the first uplink channel; or the subcarrier space corresponding to the first uplink control information being smaller than or equal to the subcarrier space of the first uplink channel.

For example, in the example of index 1 in Table 1, the TTI of the PUSCH as the first uplink channel is 0.5 ms, the transmission parameter corresponding to the first uplink control information includes a TTI of one logical channel, the TTI is 1 ms. Since 0.5 ms is smaller than 1 ms, the BSR corresponding to the logical channel 1 is to be transmitted on the PUSCH.

For example, in the example of index 2 in Table 1, the subcarrier space of the PUSCH as the first uplink channel is 30 kHz, the transmission parameter corresponding to the first uplink control information includes a subcarrier space of one logical channel, and the subcarrier space is 15 kHz. Since 15 kHZ is smaller than 30 kHZ, the BSR corresponding to the logical channel 1 is to be transmitted on the PUSCH.

For example, in the example of index 3 in Table 1, the TTI of the PUSCH as the first uplink channel is 0.5 ms, and the transmission parameter corresponding to the first uplink control information includes a TTI of one logical channel, and the TTI is 0.2 ms. Since 0.5 ms is larger than 0.2 ms, the uplink scheduling request is to be transmitted on the PUCCH.

For example, in the example of index 4 in Table 1, the subcarrier space of the PUSCH as the first uplink channel is 15 kHz, the transmission parameter corresponding to the first uplink control information includes a subcarrier space of one logical channel, and the subcarrier space is 30 kHz. Since 30 kHZ is larger than 15 kHZ, the uplink scheduling request is to be transmitted on the PUCCH.

EXAMPLE B

In the case that the first uplink control information corresponds to a plurality of transmission parameters, when the extreme value of the plurality of transmission parameters corresponding to the first uplink control information and the transmission parameter of the first uplink channel satisfy a third relationship, the terminal device determines that the channel to be transmitted in the first time unit includes a second control channel, and the information to be transmitted on the second control channel in the first time unit includes first uplink control information; or when the extreme value of the plurality of transmission parameters corresponding to the first uplink control information and the transmission parameter of the first uplink channel satisfy a fourth relationship, the terminal device determines that the channel to be transmitted in the first time unit includes the first uplink channel, and the information to be transmitted on the first uplink channel in the first time unit includes the first uplink control information or the first information.

In at least one embodiment, the third relationship is: the extreme value of the plurality of transmission time intervals corresponding to the first uplink control information being smaller than the transmission time interval of the first uplink channel; or the extreme value of the subcarrier spaces corresponding to the first uplink control information being larger than the subcarrier space of the first uplink channel.

In at least one embodiment, the fourth relationship is: the extreme value of the transmission time intervals corresponding to the first uplink control information being larger than or equal to the transmission time interval of the first uplink channel; or the extreme value of the subcarrier space corresponding to the first uplink control information being smaller than or equal to the subcarrier space of the first uplink channel.

In at least one embodiment, when the transmission parameter is a transmission time interval, the extreme value is a minimum value of the plurality of transmission time intervals; or when the transmission parameter is a subcarrier space, the extreme value is the maximum value of the subcarrier spaces.

For example, in the example of index 5 in Table 1, the TTI of the PUSCH as the first uplink channel is 0.2 ms, and the transmission parameters corresponding to the first uplink control information includes the TTIs of two logical channels: the logical channel 1, 2. The TTIs of the two logical channels are 1 ms and 0.5 ms, respectively. Since the minimum value of 0.5 ms and 1 ms is larger than 0.2 ms, the BSR corresponding to the logical channels 1, 2 is to be transmitted on the PUSCH.

For example, in the example of index 6 in Table 1, the subcarrier space of the PUSCH as the first uplink channel is 60 kHz, and the transmission parameters corresponding to the first uplink control information include subcarrier spaces of two logical channels: the logical channels 1, 2. The subcarrier spaces of the two logical channels are 15 kHz and 30 kHz, respectively. Since the maximum of 15 kHz and 30 kHz is smaller than 60 kHz, the BSR corresponding to the logical channels 1, 2 is to be transmitted on the PUSCH.

For example, in the example of index 7 in Table 1, the TTI of the PUSCH as the first uplink channel is 1 ms, and the transmission parameters corresponding to the first uplink control information includes the TTIs of two logical channels: the logical channel 1, 2. The TTIs of the logical channels are respectively 0.2 ms and 0.5 ms. Since the minimum value of 0.5 ms and 0.2 ms is smaller than 1 ms, the uplink scheduling request is to be transmitted on the PUCCH.

For example, in the example of index 8 in Table 1, the subcarrier space of the PUSCH as the first uplink channel is 15 kHz, and the transmission parameters corresponding to the first uplink control information include subcarrier spaces of two logical channels: the logical channels 1, 2. The subcarrier spaces of the two logical channels are 60 kHz and 30 kHz, respectively. Since the maximum of 60 kHz and 30 kHz is larger than 15 kHz, the uplink scheduling request is to be transmitted on the PUCCH.

EXAMPLE C

In the case that the first uplink control information corresponds to a plurality of transmission parameters, the terminal device determines that the channel to be transmitted in the first time unit includes the second control channel, and the information to be transmitted on the second control channel in the first time unit includes the second control information included in the first uplink control information;

The terminal device determines that the channel to be transmitted in the first time unit includes the first uplink channel, and the information to be transmitted on the first uplink channel in the first time unit includes third control information included in the first uplink control information, or includes the first information, wherein the first information includes information related to the third control information;

the transmission parameter corresponding to the second uplink control information and the transmission parameter of the first uplink channel satisfy a fifth relationship, and the transmission parameter corresponding to the third uplink control information and the transmission parameter of the first uplink channel satisfy a sixth relationship.

In at least one embodiment, the fifth relationship includes: the transmission time interval corresponding to the second uplink control information being smaller than the transmission time interval of the first uplink channel; or the subcarrier space corresponding to the second uplink control information being larger than the subcarrier space of the first uplink channel.

In at least one embodiment, the sixth relationship includes: the transmission time interval corresponding to the third uplink control information being larger than or equal to the transmission time interval of the first uplink channel; or the subcarrier space corresponding to the third uplink control information being smaller than or equal to the subcarrier space of the first uplink channel.

In at least one embodiment, when performing the transmission, if the channel to be transmitted in the first time unit includes the first uplink channel and the second uplink control channel, the first uplink channel is transmitted on the first time domain resource, and the first time domain resource does not include the time domain resource used for the second uplink control channel.

For example, in the example of index 9 in Table 1, the TTI of the PUSCH as the first uplink channel is 0.5 ms, and the transmission parameters corresponding to the first uplink control information includes the TTIs of two logical channels: the logical channel 1, 2. The TTIs of the two logical channels are 1 ms and 0.2 ms, respectively. Then, the BSR corresponding to the logical channel 1 is to be transmitted on the PUSCH, or the uplink scheduling request corresponding to the logical channel 2 is to be transmitted on the PUCCH.

For example, in the example of index 10 in Table 1, the subcarrier space of the PUSCH as the first uplink channel is 30 kHz, and the transmission parameters corresponding to the first uplink control information include subcarrier spaces of two logical channels: logical channels 1, 2. The subcarrier spaces of the two logical channels is 15 kHz and 60 kHz, respectively. Then, the BSR corresponding to the logical channel 1 is to be transmitted on the PUSCH, or the uplink scheduling request corresponding to the logical channel 2 is to be transmitted on the PUCCH.

Therefore, in the embodiment of the present application, the terminal device determines the channel and/or information to be transmitted in the first time unit according to the transmission parameter corresponding to the first uplink control information to be transmitted in the first time unit and the transmission parameter of the first uplink channel. Since the channel and/or information to be transmitted in the time unit is determined in connection with the transmission parameters of the channel and/or information to be transmitted, it can select a reasonable channel and/or information for transmission.

In addition, when the selected uplink channel includes the first uplink channel and does not include the second control channel that is pre-configured to transmit the first uplink control information, the first uplink control information or related information of the first uplink control information can be transmitted by multiplexing the first uplink channel. Thus, it can save transmission resources.

Further, when the TTI corresponding to the first uplink control information to be transmitted is larger than the TTI of the first control channel, since the delay requirement for the larger TTI is lower than the requirement for the lower TTI delay, the first uplink control information or related information is transmitted on an uplink channel with a lower TTI. Thus, it can save transmission resources without lowering the delay requirement for the uplink control information.

Similarly, when the subcarrier space corresponding to the first uplink control information to be transmitted is smaller than the subcarrier space of the first control channel, since the delay requirement for the smaller subcarrier space is lower than the delay requirement for the larger subcarrier space, the first uplink control information or related information can be transmitted on an uplink channel having a larger subcarrier space. Thus, it can save transmission resources without lowering the delay requirement for the uplink control information.

FIG. 3 is a schematic flowchart of a wireless communication method 300 according to an embodiment of the present application. The method 300 includes at least a portion of the following.

In 310, the network device determines first uplink control information and a first uplink channel to be received from the terminal device in a first time unit, wherein the first uplink channel is used for carrying other information than the first uplink control information, and a time domain resource of the first uplink channel includes at least part of the time domain resources of the first uplink control information.

In 320, the network device determines a channel and/or information to be received in the first time unit according to transmission parameter(s) corresponding to the first uplink control information and transmission parameter(s) of the first uplink channel.

In at least one embodiment, the first uplink control information includes at least one of the following:
scheduling request information corresponding to at least one uplink logical channel;
positive/negative response ACK/NACK information corresponding to at least one downlink physical channel;
channel state information measured on at least one group of downlink physical resources.

In at least one embodiment, the transmission parameter corresponding to the first uplink control information includes at least one of the following:

transmission parameter(s) of the at least one uplink logical channel;

transmission parameter(s) of the at least one downlink physical channel; or transmission parameters of the at least one group of downlink physical resources.

In at least one embodiment, the transmission parameter includes at least one of the following:

a transmission time interval TTI; or a subcarrier space.

In at least one embodiment, the first uplink channel is a first uplink shared channel; or the first uplink channel is a first uplink control channel.

In at least one embodiment, the channel as determined to be received in the first time unit includes a first uplink channel, and/or a second uplink control channel other than the first uplink channel.

In at least one embodiment, the information as determined to be received in the first time unit includes first the uplink control information or first information, wherein the first information includes content related to the content indicated by the first uplink control information.

In at least one embodiment, when the channel to be received in the first time unit includes the first uplink channel and does not include the second uplink control channel, the information to be received on the first uplink channel in the first time unit includes the first information or the first uplink control information; or when the channel to be received in the first time unit includes a second uplink control channel, the information to be received on the second uplink control channel in the first time unit includes the first uplink control information.

In at least one embodiment, when the first uplink control information is the scheduling request information corresponding to the uplink logical channel, the first information is the buffer status report BSR information corresponding to the uplink logical channel.

In at least one embodiment, when the first uplink control information corresponds to one transmission parameter, the network device determining the channel and/or the information to be received in the first time unit according to the transmission parameter corresponding to the first uplink control information and the transmission parameter of the first uplink channel, includes:

when the transmission parameter corresponding to the first uplink control information and the transmission parameter of the first uplink channel satisfy a first relationship, the network device determining that the channel to be received in the first time unit includes a second control channel, and the information to be received on the second control channel in the first time unit includes the first uplink control information; or when the transmission parameter corresponding to the first uplink control information and the transmission parameter of the first uplink channel satisfy a second relationship, the network device determining that the channel to be received in the first time unit includes the first uplink channel, and the information to be received on the first uplink channel includes the first uplink control information or the first information.

In at least one embodiment, the first relationship is:

the transmission time interval corresponding to the first uplink control information being smaller than the transmission time interval of the first uplink channel; or the subcarrier space corresponding to the first uplink control information being larger than the subcarrier space of the first uplink channel.

In at least one embodiment, the second relationship is:

the transmission time interval corresponding to the first uplink control information being larger than or equal to the transmission time interval of the first uplink channel; or the subcarrier space corresponding to the first uplink control information being smaller than or equal to the subcarrier space of the first uplink channel.

In at least one embodiment, when the first uplink control information corresponds to a plurality of transmission parameters, the network device determining the channel and/or information to be received in the first time unit according to the transmission parameter corresponding to the first uplink control information and the transmission parameter of the first uplink channel, includes:

when the extreme value of the plurality of transmission parameters corresponding to the first uplink control information and the transmission parameter of the first uplink channel satisfy a third relationship, the network device determining that the channel to be received in the first time unit includes a second control channel, and the information to be received on the second control channel in the first time unit includes the first uplink control information; or when the extreme value of the plurality of transmission parameters corresponding to the first uplink control information and the transmission parameter of the first uplink channel satisfy a fourth relationship, the network device determining that the channel to be received in the first time unit includes the first uplink channel, and the information to be received on the first uplink channel in the first time unit includes the first uplink control information or the first information.

In at least one embodiment, the third relationship is:

the extreme value of the plurality of transmission time intervals corresponding to the first uplink control information being smaller than the transmission time interval of the first uplink channel; or the extreme value of the subcarrier spaces corresponding to the first uplink control information being larger than the subcarrier space of the first uplink channel.

In at least one embodiment, the fourth relationship is:

the extreme value of the transmission time intervals corresponding to the first uplink control information being larger than or equal to the transmission time interval of the first uplink channel; or the extreme value of the subcarrier spaces corresponding to the first uplink control information being smaller than or equal to the subcarrier space of the first uplink channel.

In at least one embodiment, when the transmission parameter is a transmission time interval, the extreme value is a minimum value of the plurality of transmission time intervals; or when the transmission parameter is a subcarrier space, the extreme value is the maximum value of the subcarrier spaces.

In at least one embodiment, when the first uplink control information corresponds to a plurality of transmission parameters, the network device determining the channel and/or information to be received in the first time unit according to the transmission parameter corresponding to the first uplink control information and the transmission parameter of the first uplink channel includes:

the network device determining that the channel to be received in the first time unit includes a second control channel, and the information to be received on the second control channel in the first time unit includes second control information included in the first uplink control information;

the network device determining that the channel to be received in the first time unit includes the first uplink channel, and the information to be received on the first uplink channel in the first time unit includes third control information included in the first uplink control information, or includes the first information, wherein the first information includes information related to the third control information;

wherein the transmission parameter corresponding to the second uplink control information and the transmission parameter of the first uplink channel satisfy a fifth relationship, and the transmission parameter corresponding to the third uplink control information and the transmission parameter of the first uplink channel satisfy a sixth relationship.

In at least one embodiment, the fifth relationship includes:

the transmission time interval corresponding to the second uplink control information being smaller than the transmission time interval of the first uplink channel; or the subcarrier space corresponding to the second uplink control information being larger than the subcarrier space of the first uplink channel.

In at least one embodiment, the sixth relationship includes:

the transmission time interval corresponding to the third uplink control information being larger than or equal to the transmission time interval of the first uplink channel; or the subcarrier space corresponding to the third uplink control information being smaller than or equal to the subcarrier space of the first uplink channel.

In at least one embodiment, the first uplink channel is received on a first time domain resource, and the first time domain resource does not include a time domain resource used for the second control uplink channel.

It should be understood that the description of the method shown in FIG. 3 can be referred to the description in FIG. 2, and for brevity, no further details are provided herein.

FIG. 4 is a schematic block diagram of a terminal device 400 according to an embodiment of the present application. As shown in FIG. 4, the terminal device 400 includes a first determining unit 410 and a second determining unit 420.

The first determining unit 410 is configured to determine first uplink control information and a first uplink channel to be transmitted to the network device in a first time unit, wherein the first uplink channel is used for carrying other information than the first uplink control information, and a time domain resource for transmitting the first uplink channel comprises at least part of time domain resources for transmitting the first uplink control information.

The second determining unit 420 is configured to determine a channel and/or information to be transmitted in the first time unit according to transmission parameter(s) corresponding to the first uplink control information and transmission parameter(s) of the first uplink channel.

It should be understood that the terminal device 400 can perform corresponding operations of the terminal device as shown in FIG. 2. For example, the implementation for the second determining unit 420 configured to determine the channel and/or information to be transmitted in the first time unit according to transmission parameter(s) corresponding to the first uplink control information and transmission parameter(s) of the first uplink channel can refer to the description of the terminal device above, details of which will not be repeated herein for brevity.

FIG. 5 is a schematic block diagram of a network device 500 according to an embodiment of the present application. As shown in FIG. 5, the network device includes a first determining unit 510 and a second determining unit 520.

The first determining unit 510 is configured to determine first uplink control information and a first uplink channel to be received from the terminal device in a first time unit, wherein the first uplink channel is used for carrying other information than the first uplink control information, and a time domain resource of the first uplink channel includes at least part of the time domain resources of the first uplink control information.

The second determining unit 520 is configured to determine a channel and/or information to be received in the first time unit according to transmission parameter(s) corresponding to the first uplink control information and transmission parameter(s) of the first uplink channel.

It should be understood that the network device 500 can perform corresponding operations of the network device as shown in FIG. 3. For example, the implementation for the second determining unit 520 to determine the channel and/or information to be received in the first time unit according to transmission parameter(s) corresponding to the first uplink control information and transmission parameter(s) of the first uplink channel can refer to the description of the network device above, details of which will not be repeated herein for brevity.

Figure 6:
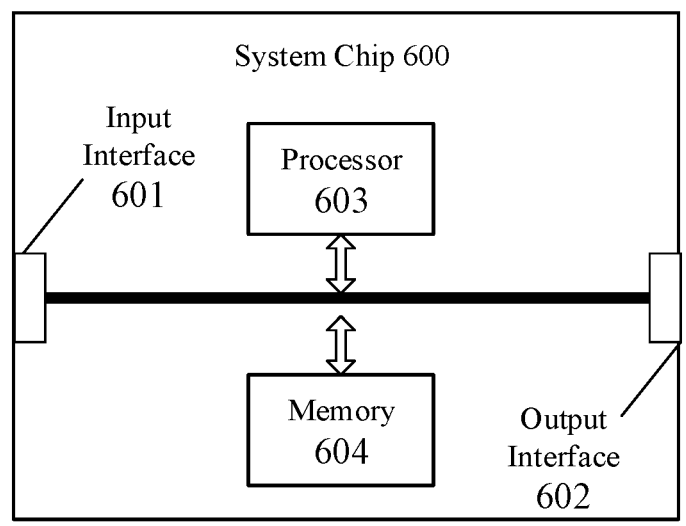
FIG. 6 is a schematic block diagram of a system chip according to an embodiment of the present application.

FIG. 6 is a schematic structural diagram of a system chip 600 according to an embodiment of the present application. The system chip 600 of FIG. 6 includes an input interface 601, an output interface 602, a processor 603, and a memory 604 that can be connected by an internal communication connection line. The processor 603 is configured to execute codes in the memory 504.

In at least one embodiment, when the codes are executed, the processor 603 implements a method performed by the network device in the method embodiment. For the sake of brevity, it will not be repeated herein.

In at least one embodiment, when the codes are executed, the processor 603 implements a method performed by the terminal device in the method embodiment. For the sake of brevity, it will not be repeated herein.

Figure 7:
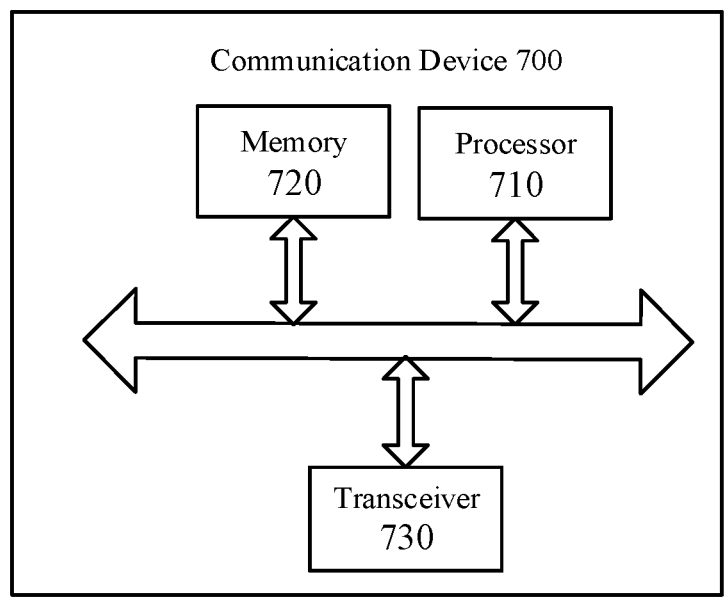
FIG. 7 is a schematic block diagram of a communication device according to an embodiment of the present application.

FIG. 7 is a schematic block diagram of a communication device 700 according to an embodiment of the present application. As shown in FIG. 7, the communication device 700 includes a processor 710 and a memory 720. The memory 720 can store program codes, and the processor 710 can execute the program codes stored in the memory 720.

In at least one embodiment, as shown in FIG. 7, the communication device 700 can include a transceiver 730, and the processor 710 can control the transceiver 730 to communicate with external entities.

In at least one embodiment, the processor 710 can call the program codes stored in the memory 720 to perform the corresponding operations of the network device in the method embodiment. For the sake of brevity, it will not be repeated herein.

In at least one embodiment, the processor 710 can call the program codes stored in the memory 720 to perform the corresponding operations of the terminal device in the method embodiment. For the sake of brevity, it will not be repeated herein.

Therefore, in the embodiment of the present application, the terminal device determines the channel and/or information to be transmitted in the first time unit according to the transmission parameter corresponding to the first uplink control information to be transmitted in the first time unit and the transmission parameter of the first uplink channel. Since the channel and/or information to be transmitted in the time unit is determined in connection with the transmission parameters of the channel and/or information to be transmitted, it can select a reasonable channel and/or information for transmission.

It should be understood that the processor of the embodiment of the present application can be an integrated circuit chip with signal processing capability. In the implementation process, each step of the above method embodiment can be completed by an integrated logic circuit of hardware in a processor or an instruction in a form of software. The processor can be a general-purpose processor, a digital signal processor (DSP), an application specific integrated circuit (ASIC), a Field Programmable Gate Array (FPGA), a programmable logic device, discrete gates or transistor logic devices, discrete hardware components. The methods, steps, and logical block diagrams disclosed in the embodiments of the present application can be implemented or executed. The general purpose processor can be a microprocessor or the processor or any conventional processor or the like. The steps of the method disclosed in the embodiments of the present application can be directly implemented by the hardware decoding processor, or can be performed by a combination of hardware and software modules in the decoding processor. The software module can be located in a conventional storage medium such as a random access memory, a flash memory, a read only memory, a programmable read only memory or an electrically erasable programmable memory, a register, and the like. The storage medium is located in the memory, and the processor reads the information in the memory and combines the hardware to complete the steps of the above method.

It is to be understood that the memory in the embodiments of the present application can be a volatile memory or a non-volatile memory, or can include both volatile and non-volatile memory. The non-volatile memory can be a read-only memory (ROM), a programmable read only memory (PROM), an erasable programmable read only memory (Erasable PROM, EPROM), or an electric Erase programmable read only memory (EEPROM) or a flash memory. The volatile memory can be a Random Access Memory (RAM) that acts as an external cache. By way of example and not limitation, many forms of RAMs are available, such as a static random access memory (SRAM), a dynamic random access memory (DRAM), a synchronous dynamic random access memory (Synchronous DRAM, SDRAM), a Double Data Rate SDRAM (DDR SDRAM), an Enhanced Synchronous Dynamic Random Access Memory (Enhanced SDRAM, ESDRAM), a Synchronous Connection Dynamic Random Access Memory (Synchlink DRAM, SLDRAM) and a direct memory bus random access memory (Direct Rambus RAM, DR RAM). It should be noted that the memories of the systems and methods described herein are intended to include, without being limited to, these and any other suitable types of memories.

Those of ordinary skill in the art will appreciate that the units and algorithm steps of the various examples described in connection with the embodiments disclosed herein can be implemented in electronic hardware or a combination of computer software and electronic hardware. Whether these functions are performed in hardware or software depends on the specific application and design constraints of the technical solution. A person skilled in the art can use different methods to implement the described functions for each particular application, but such implementation should not be considered to be beyond the scope of the present application.

A person skilled in the art can clearly understand that for the convenience and brevity of the description, the specific working process of the system, the device and the unit described above can refer to the corresponding process in the above method embodiment, and details are not described herein again.

In the several embodiments provided by the present application, it should be understood that the disclosed systems, devices, and methods can be implemented in other manners. For example, the device embodiments described above are merely illustrative. For example, the division of the unit is only a logical function division. In actual implementation, there can be another division manner, for example, multiple units or components can be combined or can be integrated into another system, or some features can be ignored or not executed. In addition, the mutual coupling or direct coupling or communication connection shown or discussed can be an indirect coupling or communication connection through some interfaces, devices or units, and can be in an electrical, mechanical or other form.

The units described as separate components can or cannot be physically separated, and the components displayed as units can or cannot be physical units, that is, can be located in one place, or can be distributed to a plurality of network units. Some or all of the units can be selected according to actual needs to achieve the purpose of the solution of the embodiment.

In addition, each functional unit in each embodiment of the present application can be integrated into one processing unit, or each unit can exist physically separately, or two or more units can be integrated into one unit.

The functions can be stored in a computer readable storage medium if implemented in the form of a software functional unit and sold or used as a standalone product. Based on such understanding, the technical solution of the present application, in its essential or with a part contributing to the prior art or a part of the technical solution, can be embodied in the form of a software product, which is stored in a storage medium, including instructions to cause a computer device (which can be a personal computer, a server, or a network device, etc.) to perform all or part of the steps of the methods described in various embodiments of the present application. The above storage medium includes: a U disk, a mobile hard disk, a read-only memory (ROM), a random access memory (RAM), a magnetic disk, or an optical disk, and the like, which can store program codes.

The above is only a specific embodiment of the present application, but the scope of protection of the present application is not limited thereto, and changes or substitutions that could be easily contemplated by any person skilled in the art within the technical scope disclosed in the present application should be covered by the scope of protection of this application. Therefore, the scope of protection of the present application should be determined by the scope of the claims.

What is claimed is:

1. A wireless communication method, comprising:
   determining, by a terminal device, first uplink control information and a first uplink channel required to be transmitted to a network device in a first time unit, wherein the first uplink channel is used for carrying other information than the first uplink control information, and a time domain resource for transmitting the first uplink channel comprises at least part of time domain resources for transmitting the first uplink control information; and
   determining, by the terminal device, at least one of a channel or information to be transmitted in the first time unit according to at least one transmission parameter corresponding to the first uplink control information and at least one transmission parameter of the first uplink channel;

wherein the first uplink control information comprises ACK/NACK information corresponding to at least one downlink physical channel;

wherein the at least one transmission parameter corresponding to the first uplink control information comprises at least one transmission parameter of the at least one downlink physical channel; and wherein the information as determined to be transmitted in the first time unit comprises the first uplink control information.

2. The method according to claim 1, wherein the first uplink control information further comprises at least one of:
   scheduling request information corresponding to at least one uplink logical channel; and
   channel state information measured on at least one group of downlink physical resources.

3. The method according to claim 2, wherein the at least one transmission parameter corresponding to the first uplink control information further comprises at least one of:
   at least one transmission parameter of the at least one uplink logical channel; and
   at least one transmission parameter of the at least one group of downlink physical resources.

4. The method according to claim 1, wherein the transmission parameter comprises at least one of:
   a transmission time interval TTI; and
   a subcarrier space.

5. The method according to claim 1, wherein the first uplink channel is one of a first uplink shared channel and a first uplink control channel.

6. The method according to claim 1, wherein the channel as determined to be transmitted in the first time unit comprises at least one of the first uplink channel and a second uplink control channel other than the first uplink channel.

7. The method according to claim 1, wherein the information as determined to be transmitted in the first time unit further comprises first information, and the first information comprises content related to the content indicated by the first uplink control information.

8. The method according to claim 7, wherein the first uplink control information is scheduling request information corresponding to an uplink logical channel, and the first information is buffer status report (BSR) information corresponding to the uplink logical channel.

9. The method according to claim 6, wherein the first uplink channel is transmitted on a first time domain resource, and the first time domain resource does not comprise the time domain resource used for the second uplink control channel.

10. A terminal device, comprising: a processor, a memory and a transceiver, wherein the processor is configured to call program codes stored in the memory, to cause the terminal device to:
    determine first uplink control information and a first uplink channel required to be transmitted to a network device in a first time unit, wherein the first uplink channel is used for carrying other information than the first uplink control information, and a time domain resource for transmitting the first uplink channel comprises at least part of time domain resources for transmitting the first uplink control information; and
    determine at least one of a channel or information to be transmitted in the first time unit according to at least one transmission parameter corresponding to the first uplink control information and at least one transmission parameter of the first uplink channel;

wherein the first uplink control information comprises ACK/NACK information corresponding to at least one downlink physical channel;

wherein the at least one transmission parameter corresponding to the first uplink control information comprises at least one transmission parameter of the at least one downlink physical channel; and wherein the information as determined to be transmitted in the first time unit comprises the first uplink control information.

11. The terminal device according to claim 10, wherein the first uplink control information further comprises at least one of:
    scheduling request information corresponding to at least one uplink logical channel; and
    channel state information measured on at least one group of downlink physical resources.

12. The terminal device according to claim 11, wherein the at least one transmission parameter corresponding to the first uplink control information further comprises at least one of:
    at least one transmission parameter of the at least one uplink logical channel; and
    at least one transmission parameter of the at least one group of downlink physical resources.

13. The terminal device according to claim 10, wherein the transmission parameter comprises at least one of:
    a transmission time interval TTI; and
    a subcarrier space.

14. The terminal device according to claim 10, wherein the first uplink channel is one of a first uplink shared channel and a first uplink control channel.

15. The terminal device according to claim 10, wherein the channel as determined to be transmitted in the first time unit comprises at least one of the first uplink channel and a second uplink control channel other than the first uplink channel.

16. The terminal device according to claim 10, wherein the information as determined to be transmitted in the first time unit further comprises first information, and the first information comprises content related to the content indicated by the first uplink control information.

17. The terminal device according to claim 16, wherein the first uplink control information is scheduling request information corresponding to an uplink logical channel, and the first information is buffer status report BSR information corresponding to the uplink logical channel.

18. The terminal device according to claim 15, wherein the first uplink channel is transmitted on a first time domain resource, and the first time domain resource does not comprise the time domain resource used for the second uplink control channel.

* * * * *